(12) United States Patent
Huang et al.

(10) Patent No.: US 11,993,343 B1
(45) Date of Patent: May 28, 2024

(54) TRANSMISSION STRUCTURE OF HUB MOTOR

(71) Applicant: Da Shiang Technology Co., Ltd., Taoyuan (TW)

(72) Inventors: Hao-Lun Huang, Taoyuan (TW); Hsiao-Yu Wang, Taoyuan (TW)

(73) Assignee: DA SHIANG TECHNOLOGY CO., LTD., Ttaoyuan (TW)

( * ) Notice: Subject to any disclaimer, the term of this patent is extended or adjusted under 35 U.S.C. 154(b) by 0 days.

(21) Appl. No.: 18/342,520

(22) Filed: Jun. 27, 2023

(30) Foreign Application Priority Data

May 22, 2023 (TW) .................................. 112118861

(51) Int. Cl.
*B62M 6/45* (2010.01)
*B62M 6/60* (2010.01)
*B62M 11/02* (2006.01)
*F16D 27/14* (2006.01)

(52) U.S. Cl.
CPC ................ *B62M 6/45* (2013.01); *B62M 6/60* (2013.01); *B62M 11/02* (2013.01); *F16D 27/14* (2013.01)

(58) Field of Classification Search
CPC .......... B62M 11/02; B62M 6/60; F16D 11/14; F16D 2011/008; F16D 27/108; F16D 27/118; F16D 27/09; F16D 27/14
See application file for complete search history.

(56) References Cited

U.S. PATENT DOCUMENTS

| | | | | |
|---|---|---|---|---|
| 6,012,538 | A * | 1/2000 | Sonobe | B62M 6/45 180/65.6 |
| 10,844,913 | B2 * | 11/2020 | Boudreau | F16D 43/02 |
| 2012/0286609 | A1 * | 11/2012 | Kasai | F16D 27/01 310/94 |
| 2013/0048394 | A1 | 2/2013 | Su et al. | |
| 2022/0001956 | A1 | 1/2022 | Mercat | |
| 2023/0067597 | A1 | 3/2023 | Dodman | |
| 2023/0234535 | A1 * | 7/2023 | Yulish | B60R 25/06 192/41 R |

FOREIGN PATENT DOCUMENTS

| | | |
|---|---|---|
| CN | 204082989 U | 1/2015 |
| CN | 108407602 A | 8/2018 |
| CN | 212627511 U | 2/2021 |
| CN | 114110034 A | 3/2022 |
| JP | 2015121248 A | 7/2015 |
| WO | 2013/139125 A1 | 9/2013 |

* cited by examiner

*Primary Examiner* — Huan Le
(74) *Attorney, Agent, or Firm* — RABIN & BERDO, P.C.

(57) ABSTRACT

A transmission structure of a hub motor has a hub shell, an axle, a motor unit, and a clutch assembly. The clutch assembly connects with the hub shell and the motor unit, and includes a driving ring, an output disc, a fixing base, a clutch disc, and a pressing ring. The motor unit drives the driving ring to rotate. The output disc is capable of driving the hub shell to rotate. The driving ring drives the clutch disc to rotate and further drives the pressing ring; the pressing ring then pushes the clutch disc to contact the output disc and further drives the output disc to rotate. The fixing base is magnetic and is disposed between the output disc and the motor unit. The clutch disc is magnetically attractable such that the clutch disc separates from the output disc when the motor unit stops working to prevent the motor unit from providing resistance.

18 Claims, 14 Drawing Sheets

TRANSMISSION STRUCTURE OF HUB MOTOR

BACKGROUND OF THE INVENTION

1. Field of the Invention

The present invention relates to a transmission structure of a hub motor, especially to a transmission structure of a hub motor that is capable of separating power source from output.

2. Description of the Prior Arts

In order to save stamina of a user while riding a bike, a power-assisted bike is developed with a hub motor installed at a hub of one of wheels. The hub motor is capable of detecting an instantaneous speed of the bike and supplying power to assist the user via exporting an angular momentum to the wheel.

Due to legal restrictions, a speed that the hub motor can offer is restricted to a speed limit. The bike may reach or exceed the speed limit while going downhill or being accelerated by the user, and the hub motor stops working as long as the bike reaches the speed limit. However, the hub motor still engages with the hub of the wheel, such that the wheel needs to drive the hub motor to rotate instead, and the hub motor generates a resistance to the wheel and then wastes the stamina of the user.

To overcome the shortcomings, the present invention provides a transmission structure of a hub motor to mitigate or obviate the aforementioned problems.

SUMMARY OF THE INVENTION

The main objective of the present invention is to provide a transmission structure of a hub motor that is capable of connecting or separating a hub shell and a motor unit.

The transmission structure of hub motor has a hub shell, an axle, a motor unit, and a clutch assembly. The axle is disposed through two opposite surfaces of the hub shell, and an extending direction of the axle is defined as a first direction. The motor unit is disposed in the hub shell and mounted on the axle, a rotating direction driven by the motor unit is defined as a first rotating direction. The clutch assembly is mounted in the hub shell, and the clutch assembly connects with the hub shell and the motor unit. The clutch assembly includes a driving ring, an output disc, a fixing base, a clutch disc, a pressing ring, and an elastic unit.

The driving ring is connected to and driven by the motor unit, and the driving ring is capable of rotating along the first rotating direction. The driving ring has a first surrounding teeth portion.

The output disc is rotatably connected to the hub shell and is capable of driving the hub shell to rotate, and the output disc includes multiple first toothed engaging portions formed on a surface of the output disc which faces towards the motor unit, and the first toothed engaging portions surrounding a rotating axis of the output disc. The first toothed engaging portions are connected to each other.

The fixing base is disposed between the output disc and the motor unit, and the fixing base is magnetic. The fixing base has a first pressing surface facing towards the output disc, and a first sliding portion formed on the first pressing surface.

The clutch disc is magnetically attractable and is moveable between the fixing base and the output disc along the first direction. The clutch disc has a second surrounding teeth portion, multiple second toothed engaging portions, and a first abutting portion. The second surrounding teeth portion engages with the first surrounding teeth portion, and thereby the driving ring is capable of driving the clutch disc rotate. The multiple second toothed engaging portions are formed on a surface of the clutch disc which faces towards the output disc, and the second toothed engaging portions selectively engages with the first toothed engaging portions, and the second toothed engaging portions are connected to each other. The first abutting portion is formed on another surface of the clutch disc which is away from the output disc.

The pressing ring is disposed between the first pressing surface and the clutch disc, and the pressing ring is capable of moving along the first direction. The pressing ring detachably contacts the clutch disc and has a second abutting portion and a second sliding portion. The second abutting portion is formed on a surface of the pressing ring which faces towards the clutch disc, and the second abutting portion selectively abuts the first abutting portion, thereby the clutch disc being capable of driving the pressing ring to rotate. The second sliding portion contacts the first sliding portion and is capable of sliding with respect to the first sliding portion, thereby the pressing ring moving toward the output disc.

The elastic unit is disposed between the fixing base and the surface of the pressing ring which faces towards the clutch disc, and the elastic unit abuts the fixing base and is configured to push the pressing ring.

Therefore, when the motor unit stops working, the clutch disc separates from the output disc, thereby preventing the motor unit from generating a resistance to the hub shell; on the other hand, when the motor unit starts exporting power, the pressing ring pushes the clutch disc to engage with the output disc, thereby transmitting power to a corresponding wheel.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
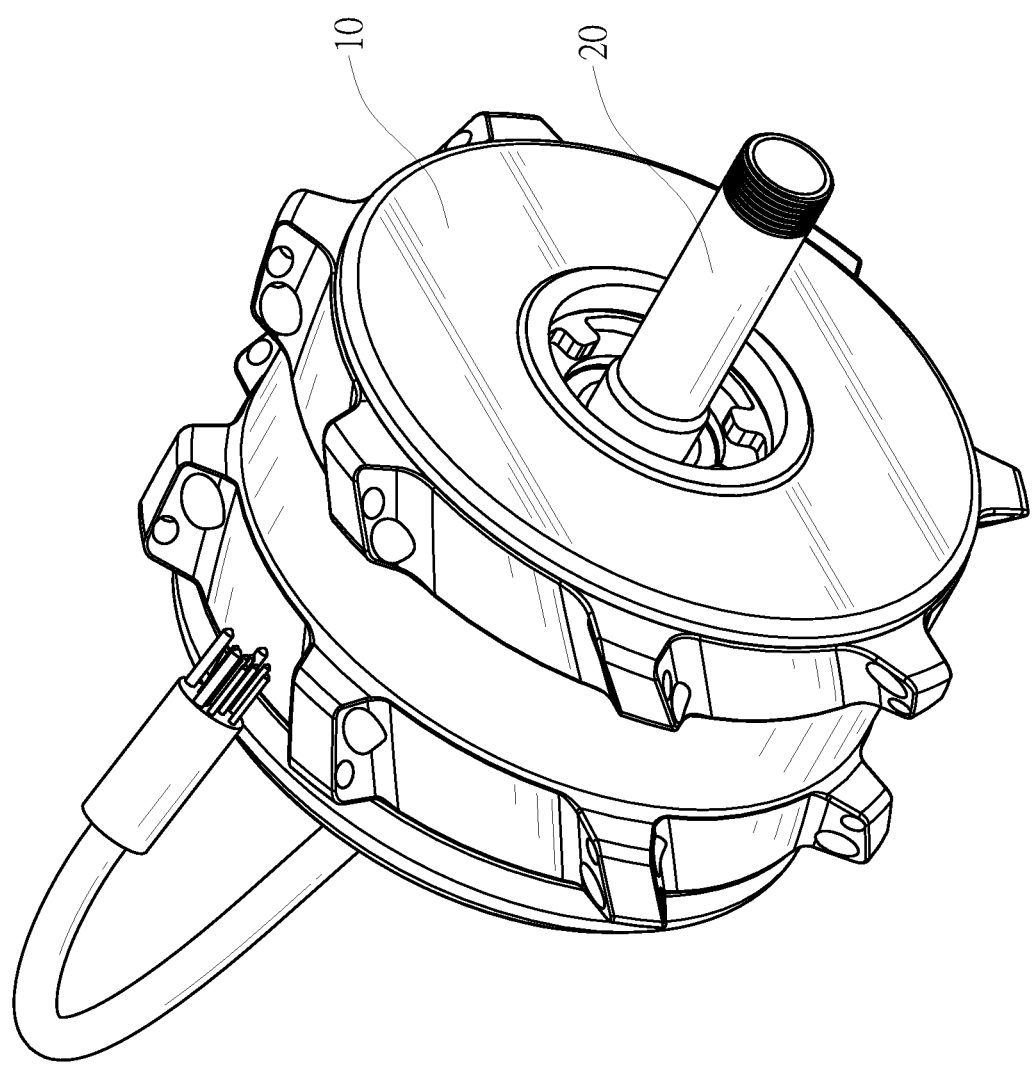
FIG. 1 is a perspective view of a preferred embodiment of a transmission structure of a hub motor in accordance with the present invention.
Figure 2:
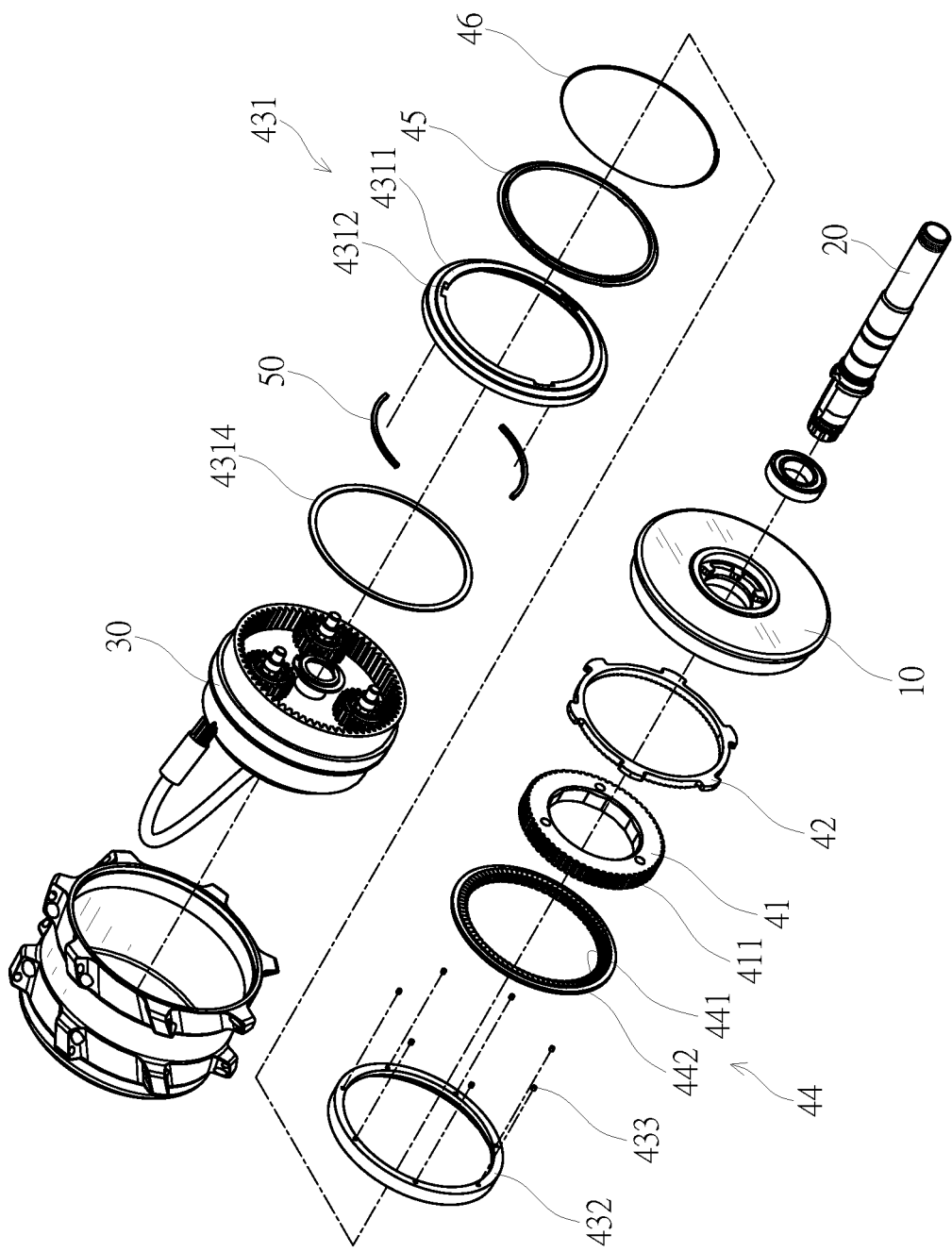
FIG. 2 is an exploded perspective view of the transmission structure in FIG. 1.
Figure 3:
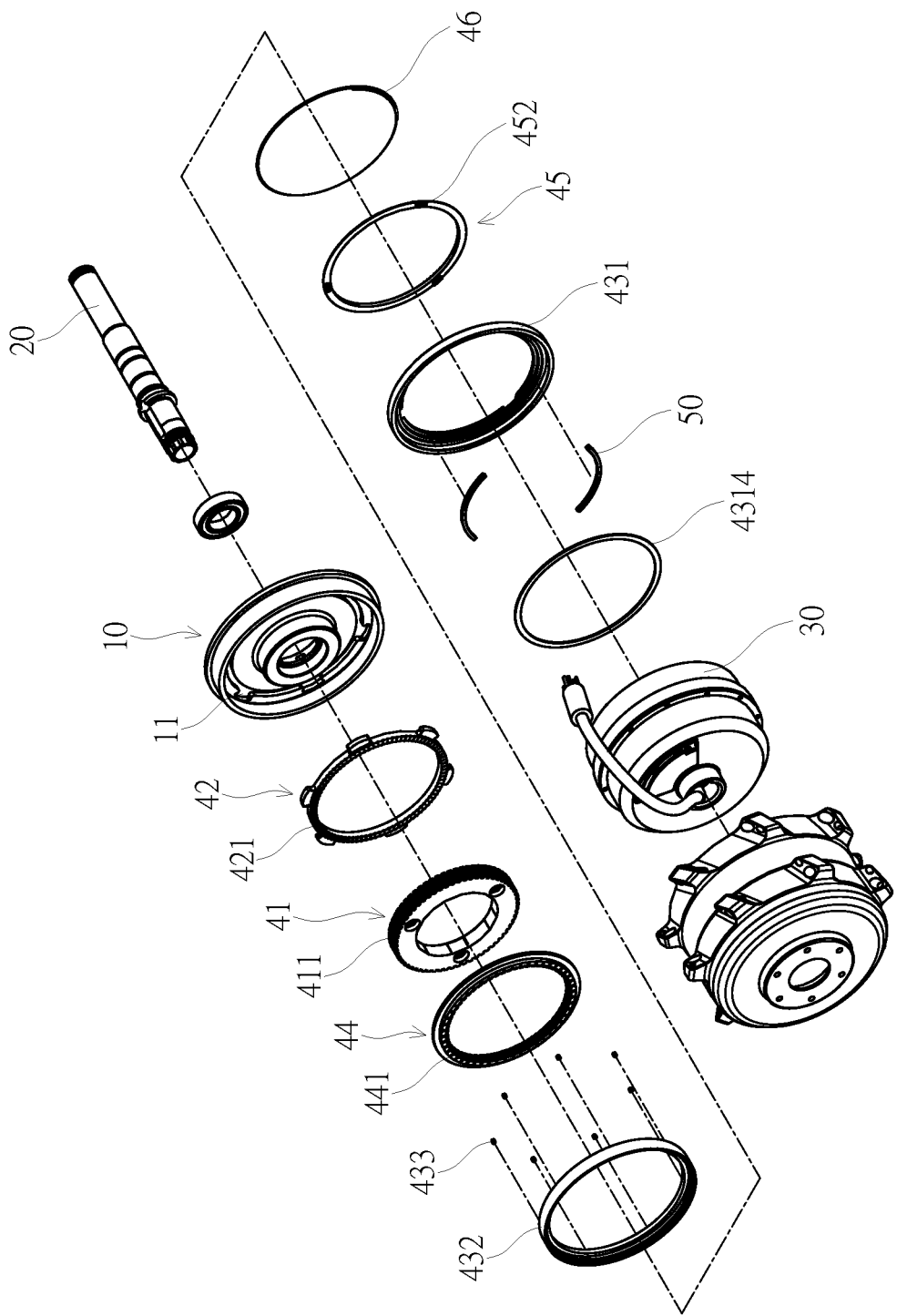
FIG. 3 is another exploded perspective view of the transmission structure in FIG. 1.
Figure 4:
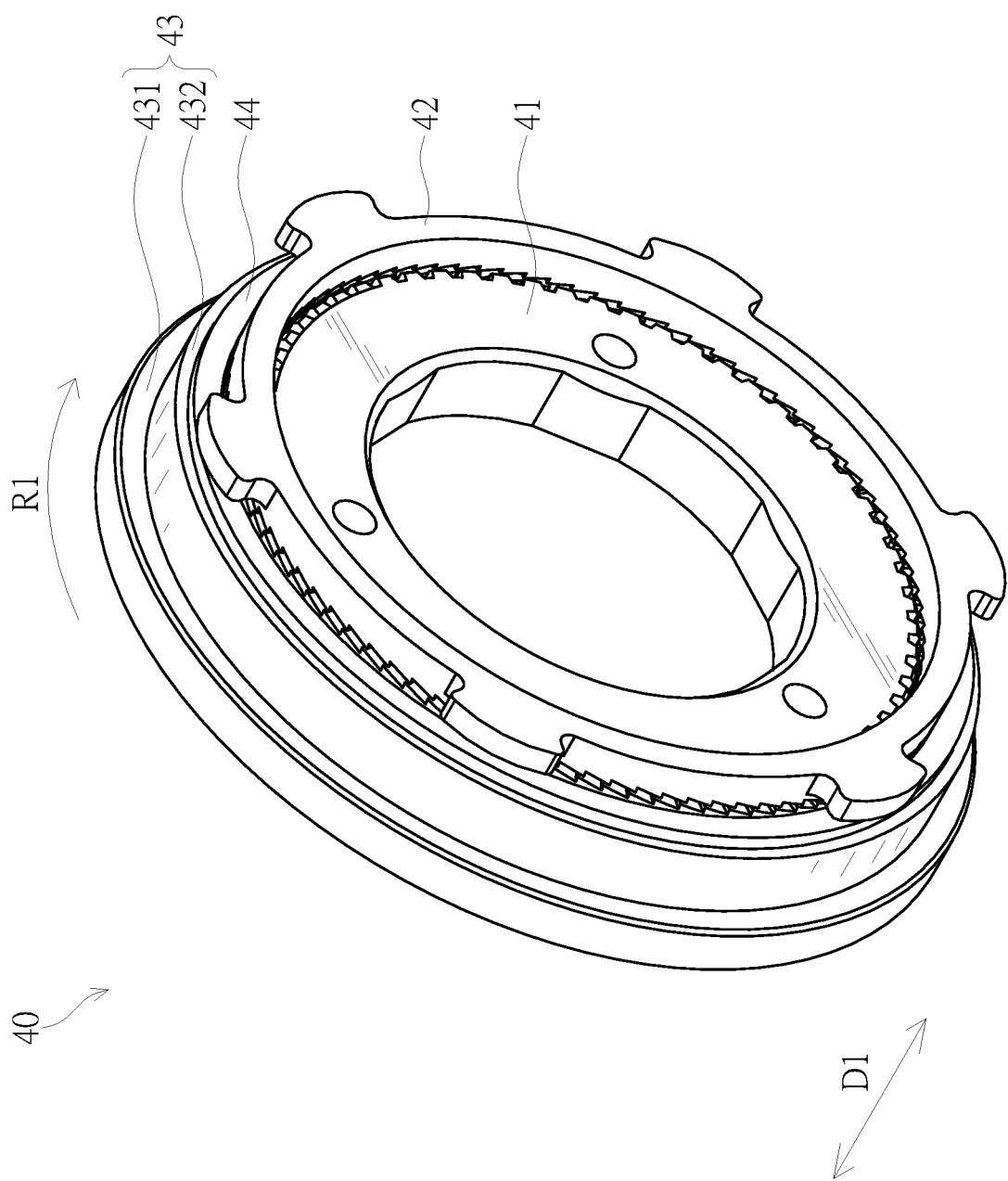
FIG. 4 is a perspective view of a clutch assembly of the transmission structure in FIG. 1.
Figure 5:
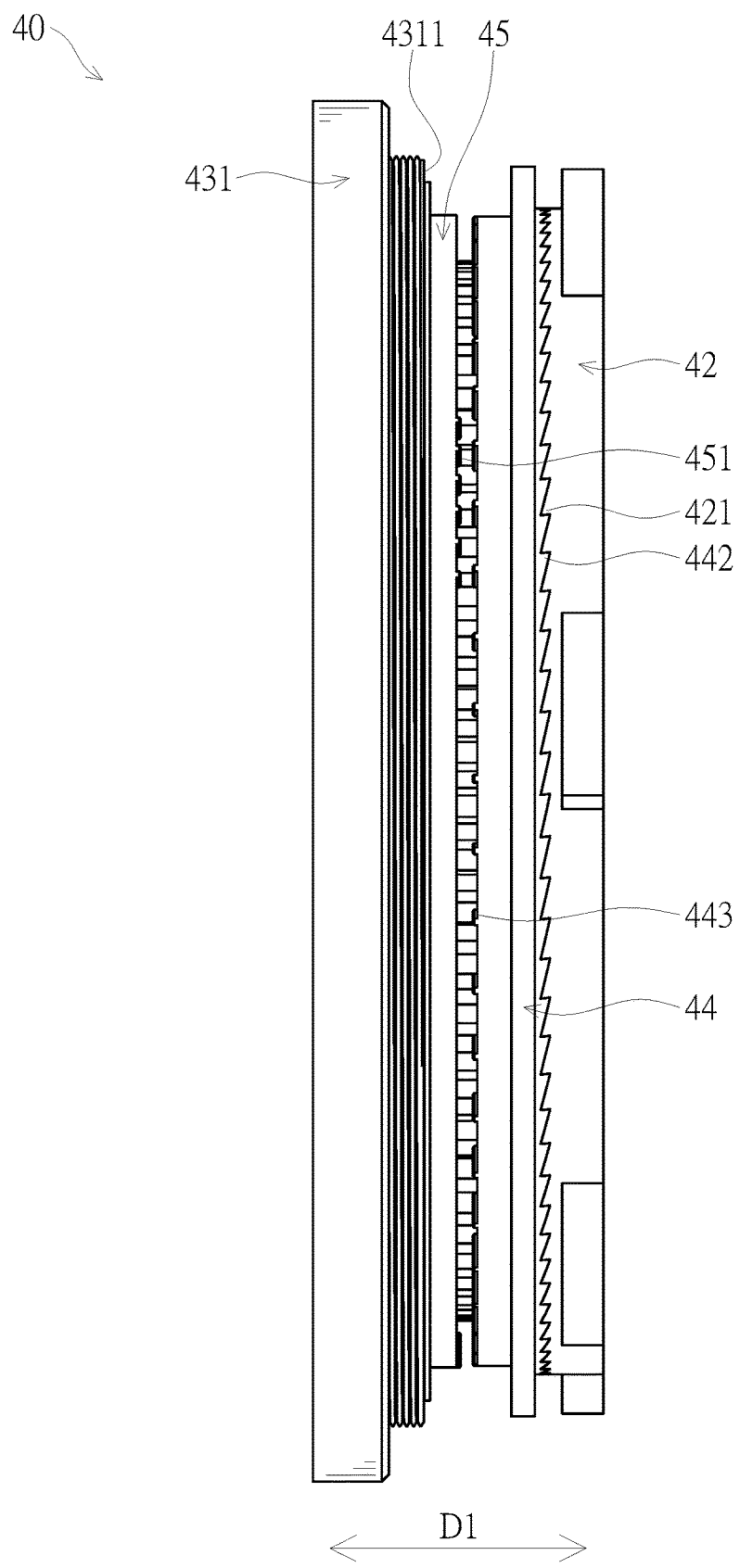
FIG. 5 is a side view of the clutch assembly in FIG. 4.
Figure 6:
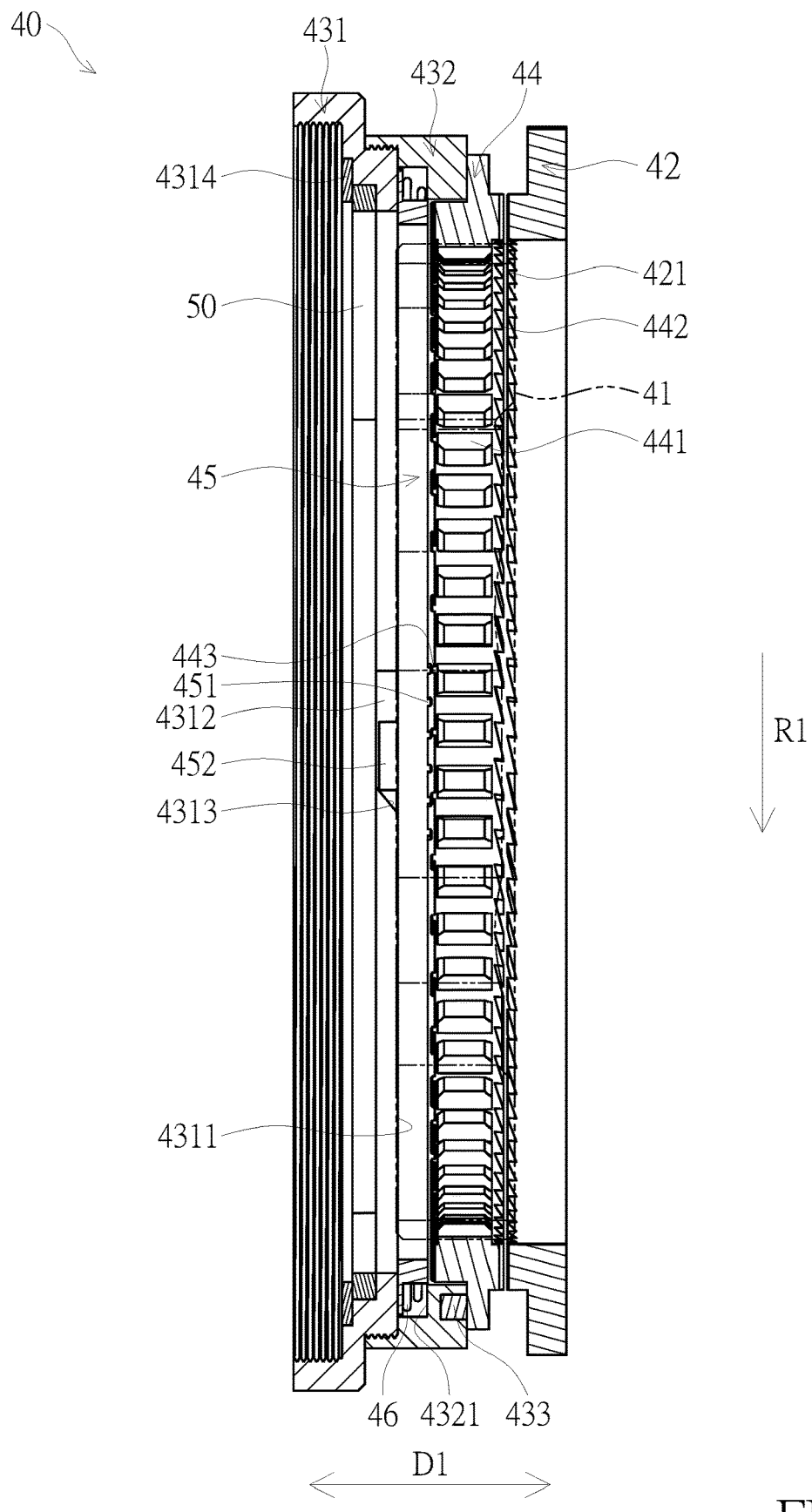
FIGS. 6 to 8 are cross-sectional side views of the clutch assembly in FIG. 4, showing a process of a clutch disc contacting and engaging an output disc, and shown with a driving ring in phantom line.
Figure 7:
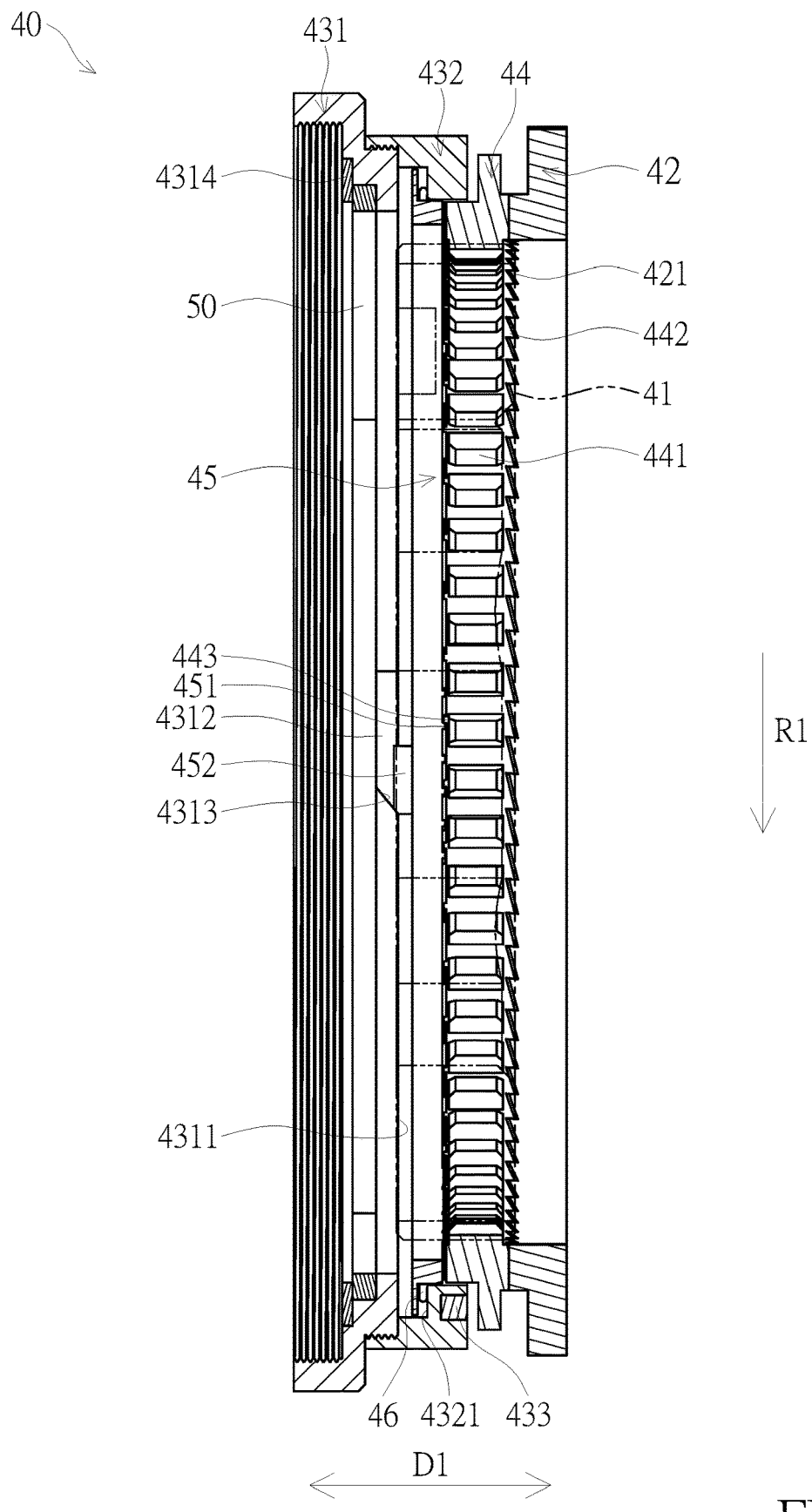
Figure 8:
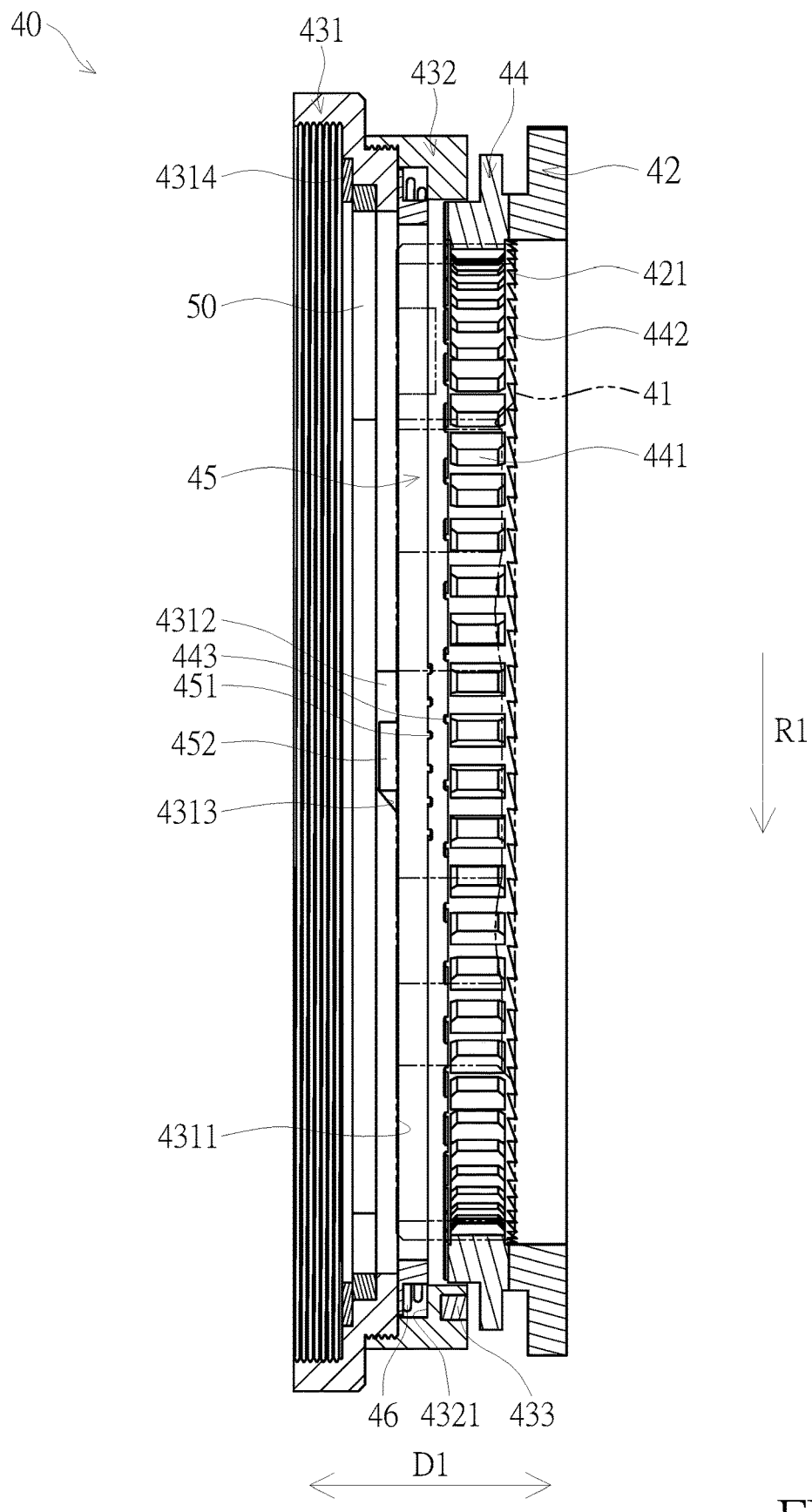
Figure 9:
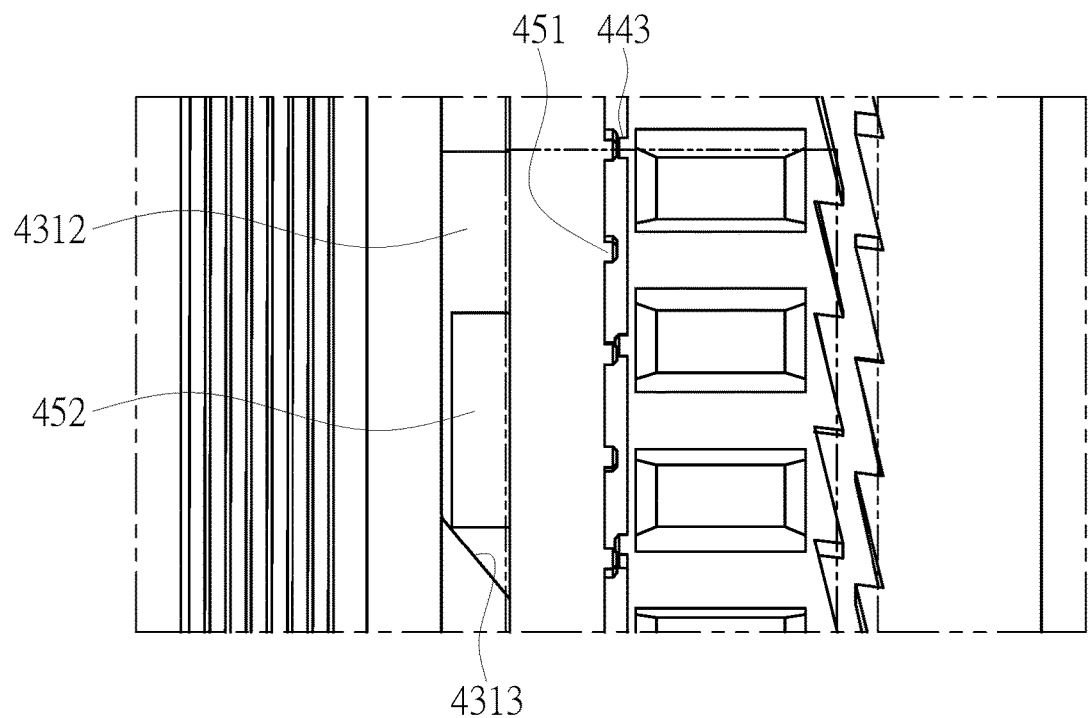
FIG. 9 is a partial enlarged view of FIG. 6.
Figure 10:
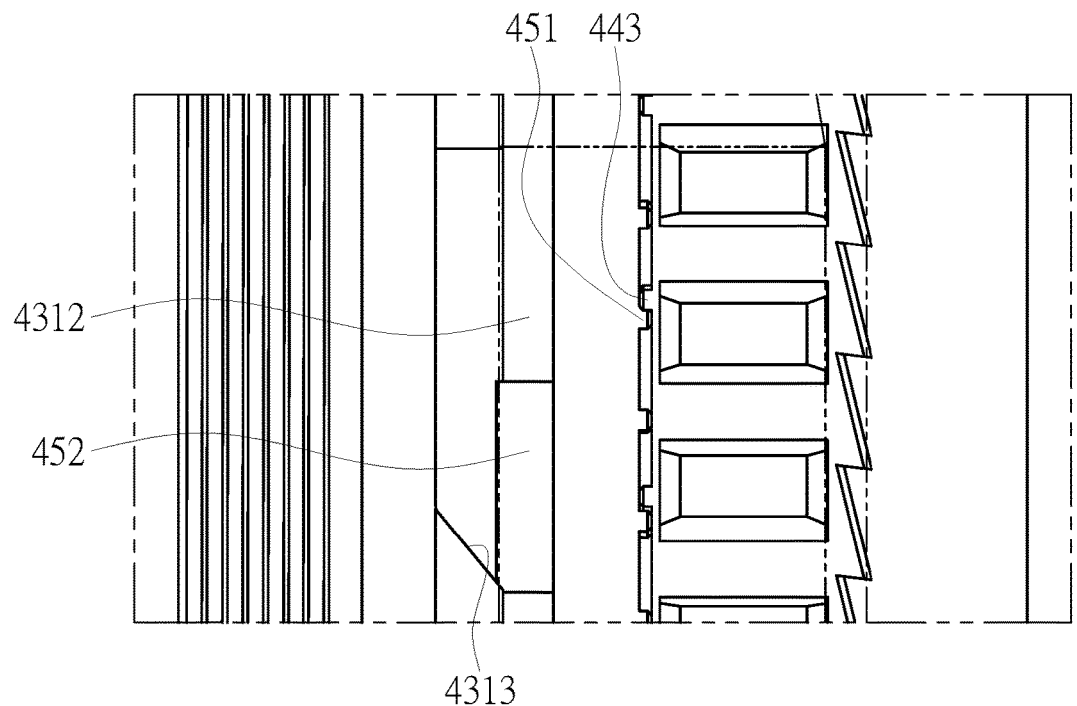
FIG. 10 is a partial enlarged view of FIG. 7.
Figure 11:
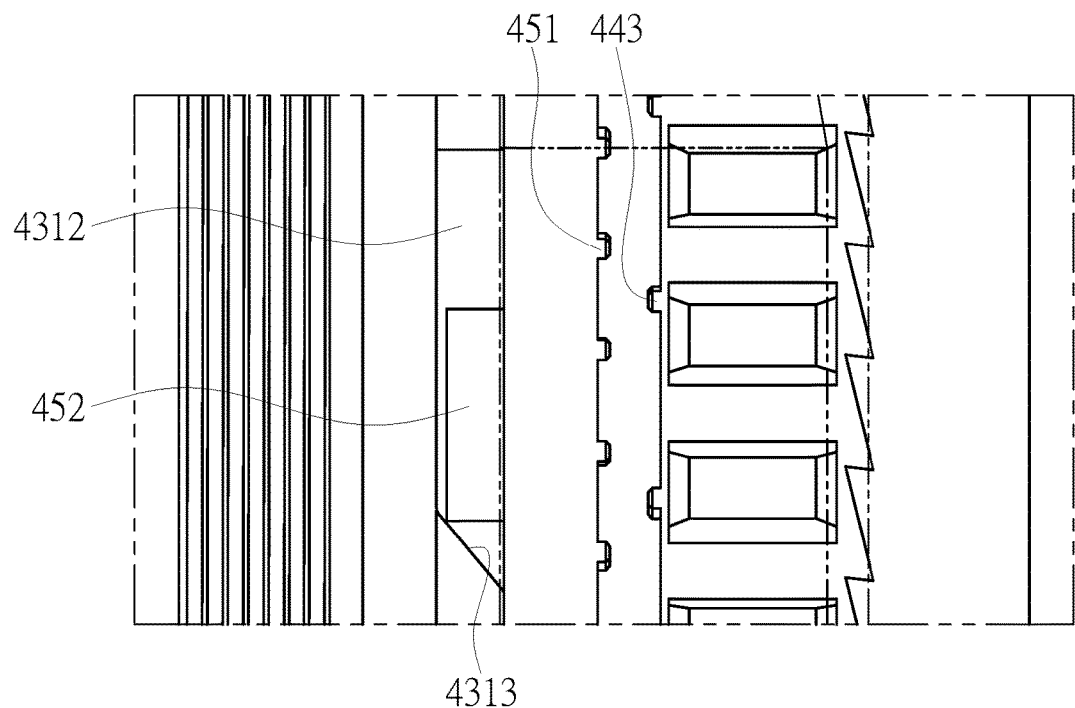
FIG. 11 is a partial enlarged view of FIG. 8.

With reference to FIGS. 1 to 4, a first embodiment of a transmission structure of a hub motor in accordance with the present invention comprises a hub shell 10, an axle 20, a motor unit 30, a clutch assembly 40, and a second magnetic unit 50.

The axle 20 is mounted through two opposite surfaces of the hub shell 10, and an extending direction of the axle 20 is defined as a first direction D1. The motor unit 30 is mounted in the hub shell 10, and is mounted on the axle 20. A rotating direction which is driven by the motor unit 30 is defined as a first rotating direction R1.

With reference to FIGS. 2 to 5 and 12, the clutch assembly 40 is mounted in the hub shell 10, and the clutch assembly 40 connects with the hub shell 10 and the motor unit 30. In this embodiment, the axle 20 is disposed through the clutch assembly 40, and the clutch assembly 40 is capable of rotating with respect to the axle 20, but it is not limited thereto. The clutch assembly 40 includes a driving ring 41, an output disc 42, a fixing base 43, a clutch disc 44, a pressing ring 45, and an elastic unit 46.

The driving ring 41 is connected to the motor unit 30, and is driven by the motor unit 30, thereby the driving ring 41 being capable of rotating along the first rotating direction R1. The driving ring 41 has a first surrounding teeth portion 411, to be more precise, in this embodiment, the first surrounding teeth portion 411 is formed on an outer annular surface of the driving ring 41, but it is not limited thereto.

The output disc 42 is rotatably connected to the hub shell 10, and is capable of driving the hub shell 10 to rotate. In this embodiment, the hub shell 10 has an engaging recess 11. A shape of the engaging recess 11 corresponds to a shape of the output disc 42, and the output disc 42 is engaged with the engaging recess 11, but it is not limited thereto. For example, in another embodiment, the output disc 42 may be fixed on the hub shell 10 via a bolt. The output disc 42 has multiple first toothed engaging portions 421 which are formed on a surface of the output disc 42 which faces towards the motor unit 30, and the first toothed engaging portions 421 surround a rotating axis of the output disc 42.

Figure 12:
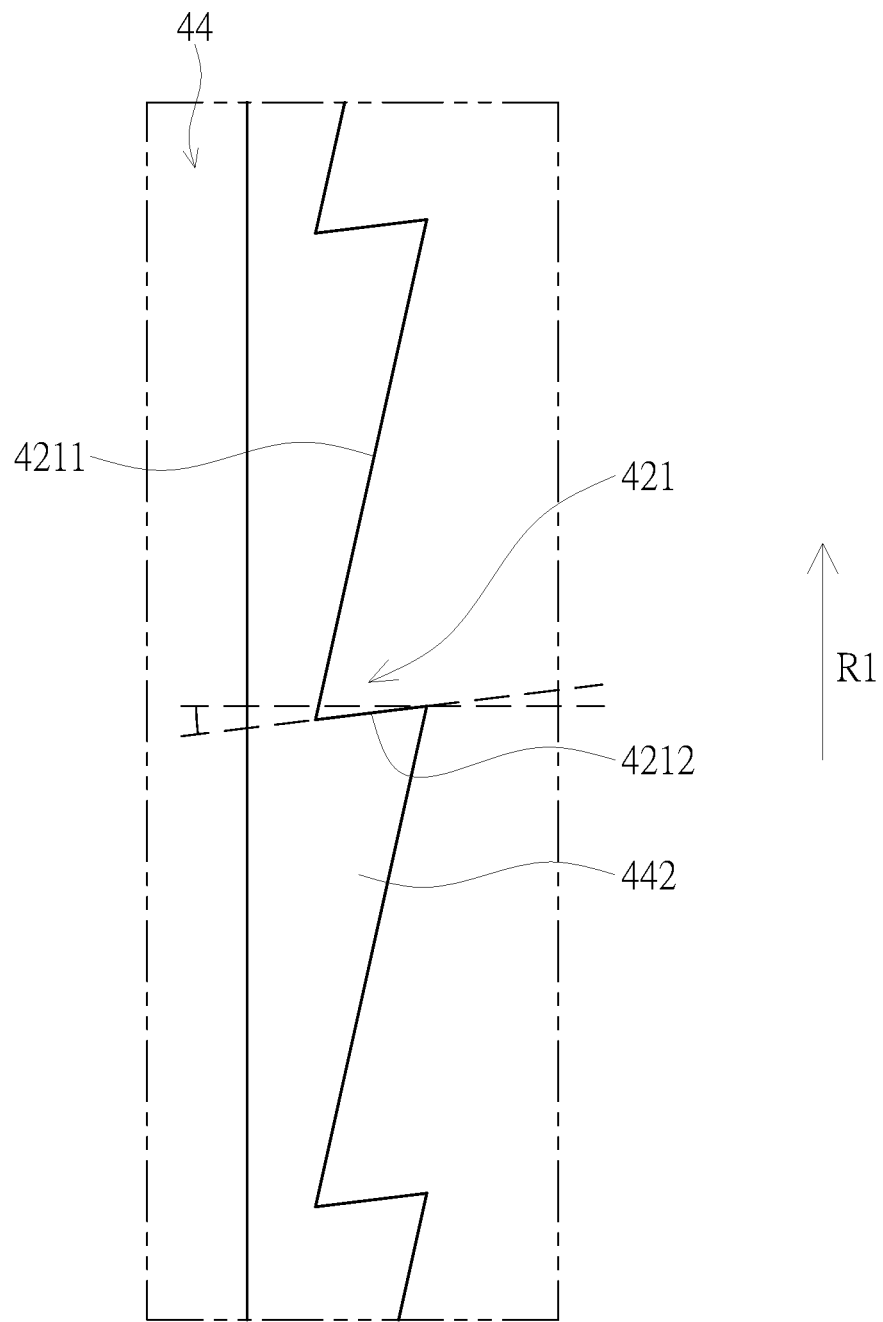
FIG. 12 is a partial enlarged view of FIG. 11, showing first toothed engaging portions engaged with second toothed engaging portions.

Each one of the first toothed engaging portions 421 is a ratchet, and the first toothed engaging portions 421 are connected to each other. Each one of the first toothed engaging portions 421 includes a first tooth surface 4211 and a second tooth surface 4212. The first tooth surface 4211 and the second tooth surface 4212 are connected to each other. The first tooth surface 4211 and the second tooth surface 4212 extend to the motor unit 30, and are inclined toward an opposite tangent direction of the first rotating direction R1. To be more precise, the first toothed engaging portions 421 protrude from the output disc 42 and to the motor unit 30. As shown in FIG. 12, the first tooth surface 4211 and the second tooth surface 4212 are inclined with respect to the first direction D1 and toward the opposite tangent direction of the first rotating direction R1.

The fixing base 43 is disposed between the output disc 42 and the motor unit 30 and is magnetic. In this embodiment, the fixing base 43 includes a base portion 431, a fixing portion 432, and a first magnetic unit 433. The base portion 431 has a first pressing surface 4311 and a first sliding portion 4312, and the first pressing surface 4311 faces towards the output disc 42; to be more precise, the first pressing surface 4311 is a surface of the base portion 431 which faces towards the output disc 42, and the first sliding portion 4312 is formed on the first pressing surface 4311.

The first sliding portion 4312 has an inclined surface 4313 which faces towards the pressing ring 45, and is inclined with respect to the pressing ring 45. To be more precise, the inclined surface 4313 faces along a direction which is opposite to the first rotating direction R1 and oriented toward the pressing ring 45. In this embodiment, the first sliding portion 4312 is a recess, and the inclined surface 4313 is one of lateral surfaces of the recess; in another embodiment, the first sliding portion may be a protrusion which protrudes from the first pressing surface 4311.

The fixing portion 432 is connected to a side of the base portion 431 which is adjacent to the output disc 42, and extends to a location between the clutch disc 44 and the pressing ring 45. The fixing portion 432 includes a second pressing surface 4321. The first magnetic unit 433 is mounted on the fixing portion 432, and thereby the first magnetic unit 433 serves as a source of magnetic force of the fixing base 43. The second pressing surface 4321 faces towards the first pressing surface 4311, and the second pressing surface 4321 is spaced apart from the first pressing surface 4311, and thus a groove is formed between the first pressing surface 4311 and the second pressing surface 4321. To be more precise, in this embodiment, the second pressing surface 4321 is a surface of the fixing portion 432 which faces towards the first pressing surface 4311.

The clutch disc 44 is moveable between the output disc 42 and the fixing base 43 along the first direction D1. The clutch disc 44 is magnetically attractable, and thus the clutch disc 44 is attractable by the fixing base 43. The clutch disc 44 has a second surrounding teeth portion 441, multiple second toothed engaging portions 442, and a first abutting portion 443. To be more precise, in this embodiment, the clutch disc 44 has an inner annular lateral surface, and the second surrounding teeth portion 441 is formed on the inner annular lateral surface, but it is not limited thereto. The second surrounding teeth portion 441 engages with the first surrounding teeth portion 411, and thereby the driving ring 41 is capable of driving the clutch disc 44 to rotate.

The second toothed engaging portions 442 are formed on a surface of the clutch disc 44 which faces towards the output disc 42, and each one of the second toothed engaging portions 442 is a ratchet. The second toothed engaging portions 442 are connected to each other, and a shape of each one of the second toothed engaging portions 442 corresponds to a shape of each one of the first toothed engaging portion 421. The second toothed engaging portions 442 are selectively engaged with the first toothed engaging portions 421, thus the clutch disc 44 is engaged with the output disc 42. The first abutting portion 443 is formed on a surface of the clutch disc 44 which is away from the output disc 42; to be more precise, the first abutting portion 443 protrudes from the surface of the clutch disc 44 which faces towards the pressing ring 45.

The pressing ring 45 is magnetically attractable and is movable along the first direction D1; in another embodiment, the pressing ring may not be magnetically attractable. The pressing ring 45 is disposed between the first pressing surface 4311 and the clutch disc 44, and the pressing ring 45 detachably contacts the clutch disc 44. To be more precise, in this embodiment, the pressing ring 45 is disposed in the groove between the first pressing surface 4311 and the second pressing surface 4321, and is moveable between the first pressing surface 4311 and the second pressing surface 4321 along the first direction D1.

The pressing ring 45 includes a second abutting portion 451 and a second sliding portion 452. The second abutting portion 451 is formed on a surface of the pressing ring 45 which faces towards the clutch disc 44, and the second abutting portion 451 selectively abuts the first abutting portion 443. To be more precise, the second abutting portion 451 protrudes from the surface of the pressing ring 45 which faces towards the clutch disc 44, and the first abutting portion 443 is capable of pushing the second abutting portion 451 along the first rotating direction R1, thereby the clutch disc 44 being capable of driving the pressing ring 45 to rotate along the first rotating direction R1.

The second sliding portion 452 contacts the first sliding portion 4312, and is capable of sliding with respect to the first sliding portion 4312, and thereby the pressing ring 45 is capable of moving to the output disc 42. To be more precise, the second sliding portion 452 in this embodiment has a block, the block protrudes from a surface of the pressing ring 45 which faces towards the first pressing surface 4311, and contacts the inclined surface 4313 of the first sliding portion 4312; the second sliding portion 452 is slidable with respect to the inclined surface 4313, but it is not limited thereto. In another embodiment, the second sliding portion may not include the block.

The elastic unit 46 is disposed between the fixing base 43 and the surface of the pressing ring 45 which faces towards the clutch disc 44; to be more precise, the elastic unit 46 is a compression spring which is mounted between the second pressing surface 4321 and the pressing ring 45. The elastic unit 46 abuts the second pressing surface 4321, and the elastic unit 46 is configured to push the pressing ring 45 to move to the first pressing surface 4311.

The second magnetic unit 50 is mounted on the fixing base 43 and configured to attract the pressing ring 45. To be more precise, the second magnetic unit 50 is mounted at the base portion 431 of the fixing base 43 and is adjacent to the first sliding portion 4312, and thereby the second magnetic unit 50 attracts the pressing ring 45 and avoids affecting the first magnetic unit 433 attracting the clutch disc 44. In another embodiment, the transmission structure may not include the second magnetic unit 50. In this embodiment, the fixing base 43 further has a positioning ring 4314 which is mounted at the base portion 431, and the positioning ring 4314 is configured to fix the second magnetic unit 50; in another embodiment, the fixing base 43 may not have the positioning ring 4314.

With reference to FIGS. 6 to 12, when the motor unit 30 starts working, the driving ring 41 is driven to rotate along the first rotating direction R1, and the driving ring 41 also drives the clutch disc 44 to rotate along the first rotating direction R1. In the meantime, the clutch disc 44 drives the pressing ring 45 to rotate along the first rotating direction R1 due to the first abutting portion 443 of the clutch disc 44 abutting the second abutting portion 451 of the pressing ring 45.

Next, the second sliding portion 452 slides with respect to the inclined surface 4313 of the first sliding portion 4312 while the pressing ring 45 rotates, and thereby the pressing ring 45 moves toward the output disc 42 along the first direction D1 and pushes the clutch disc 44 to move toward the output disc 42 along the first direction D1 until the second toothed engaging portions 442 of the clutch disc 44 contact the first toothed engaging portions 421 of the output disc 42. As shown in FIG. 12, because the first tooth surface 4211 and the second tooth surface 4212 are inclined with respect to the first direction D1 and toward the opposite tangent direction of the first rotating direction R1, the clutch disc 44 is capable of driving the output disc 42 to rotate and keeping engaging with the output disc 42 when a rotating speed of the clutch disc 44 is higher than or equal to a rotating speed of the output disc 42.

When the second toothed engaging portions 442 contact and engage with the first toothed engaging portions 421, due to the first tooth surface 4211 and the second tooth surface 4212 inclined with respect to the first direction D1, the clutch disc 44 moves toward the output disc 42 along the first direction D1, and thereby the clutch disc 44 separates from the pressing ring 45. The elastic unit 46 then pushes the pressing ring 45 back to the first pressing surface 4311 of the fixing base 43, and the second magnetic unit 50 attracts the second sliding portion 452 to move back to a position before the pressing ring 45 is moved by the clutch disc 44. In addition, alternatively, not the whole pressing ring 45, but only the second sliding portion 452, is magnetically attractable, such that the second magnetic unit 50 is capable of attracting the pressing ring 45 to restore location more accurately.

Besides, when the rotating speed of the output disc 42 reaches a speed limit, the motor unit 30 stops working and thus the rotating speed of the clutch disc 44 reduces and is lower than the rotating speed of the output disc 42. Since the first tooth surface 4211 and the second tooth surface 4212 of each one of the first toothed engaging portions 421 are inclined with respect to the first direction D1 and toward the opposite tangent direction of the first rotating direction R1, the first toothed engaging portions 421 separate from the second toothed engaging portions 442 and press the clutch disc 44 to move toward the motor unit 30 along the first direction D1, and the first magnetic unit 433 attracts the clutch disc 44 in the meantime. Therefore, the first toothed engaging portions 421 completely separate from the second toothed engaging portions 442.

Figure 13:
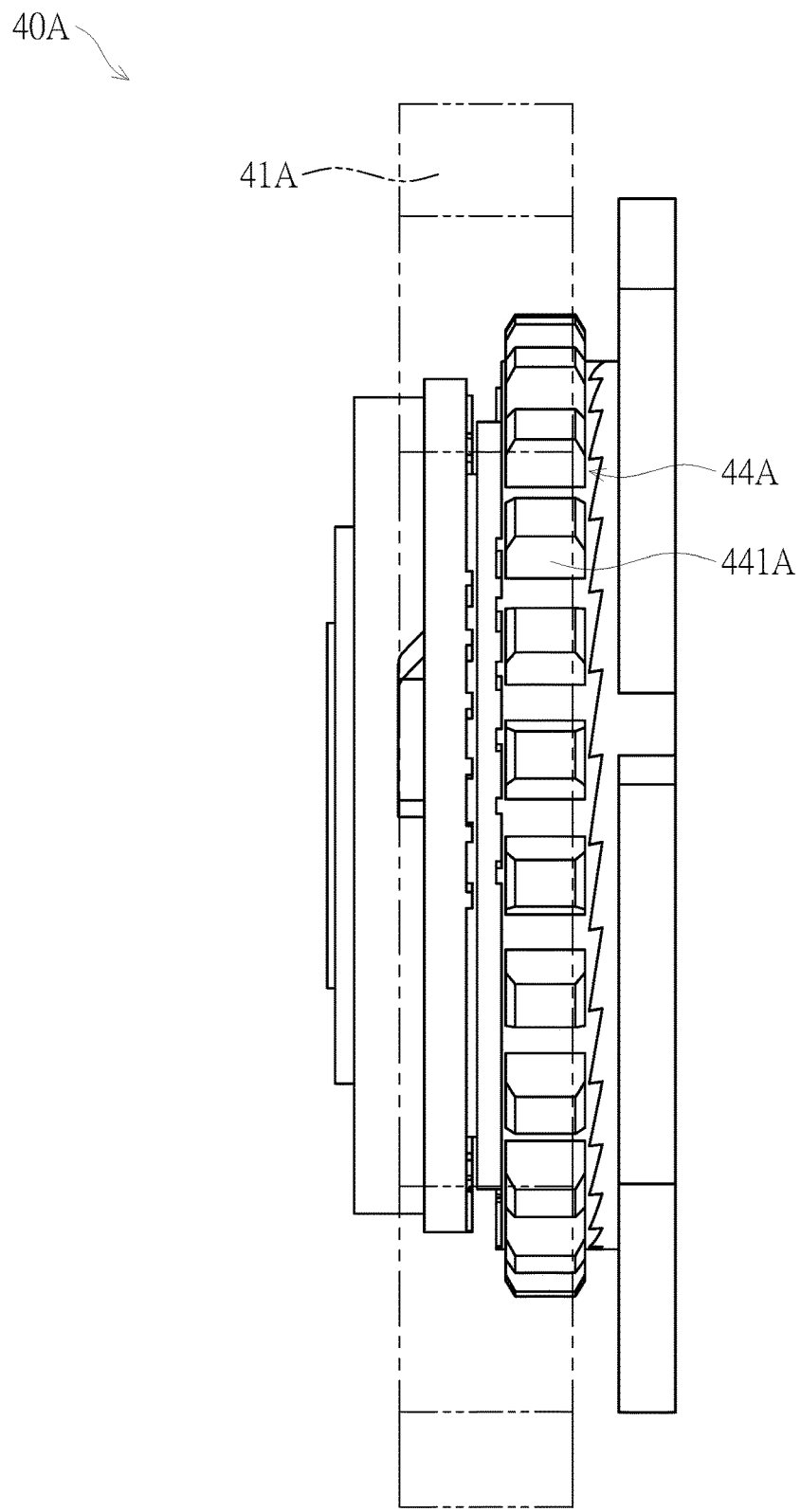
FIG. 13 is a side view of another embodiment of the clutch assembly of the transmission structure of a hub motor in accordance with the present invention, shown with the driving ring in phantom line.
Figure 14:
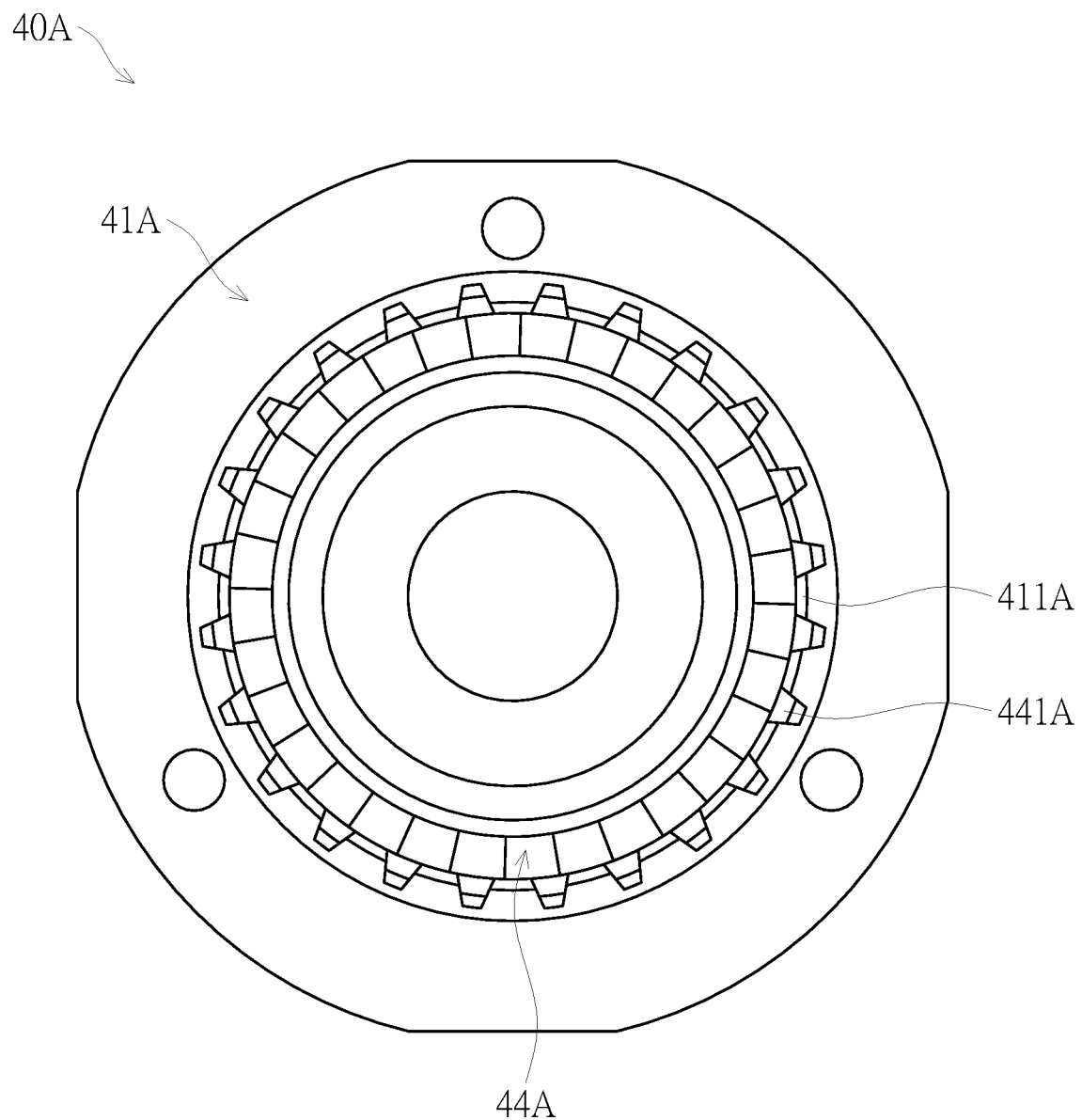
FIG. 14 is a back view of the clutch assembly in FIG. 13, shown without an output disc.

With reference to FIGS. 13 and 14, a main difference between a second embodiment and the first embodiment of the transmission structure is the clutch assembly. In the clutch assembly 40A of this embodiment, the first surrounding teeth portion 411A is formed on an inner annular surface of the driving ring 41A; the clutch disc 44A has an outer annular lateral surface, and the second surrounding teeth portion 441A is formed on the outer annular lateral surface.

In summary, the clutch assembly 40 in the transmission structure is capable of separating the hub shell 10 from the motor unit 30 when the motor unit 30 is not working, and preventing energy loss of the hub shell 10 caused by driving the motor unit 30 to rotate. Besides, the fixing base 43 separates the clutch disc 44 from the output disc 42 when the motor unit 30 is not working to avoid damages by collision between the clutch disc 44 and the output disc 42 constantly contacting each other. When the motor unit 30 starts working, the pressing ring 45 pushes the clutch disc 44 to move and then contact the output disc 42, such that the clutch disc 44 drives the output disc 42 to rotate, transmits power of the motor unit 30 to the hub shell 10, and then the pressing ring 45 moves back to avoid affecting the clutch disc 44 rotating.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. Transmission structure comprising:
  a hub shell;
  an axle disposed through two opposite surfaces of the hub shell, and an extending direction of the axle defined as a first direction;
  a motor unit disposed in the hub shell and mounted on the axle, a rotating direction driven by the motor unit defined as a first rotating direction;
  a clutch assembly mounted in the hub shell, and the clutch assembly connecting the hub shell and the motor unit; the clutch assembly including:
    a driving ring connected to and driven by the motor unit, and the driving ring capable of rotating along the first rotating direction; the driving ring having a first surrounding teeth portion;
    an output disc rotatably connected to the hub shell and capable of driving the hub shell to rotate; the output disc including:
      multiple first toothed engaging portions formed on a surface of the output disc which faces towards the motor unit, and the first toothed engaging portions surrounding a rotating axis of the output disc; the first toothed engaging portions connected to each other;
  a fixing base disposed between the output disc and the motor unit, and the fixing base being magnetic and having
    a first pressing surface facing towards the output disc; and
    a first sliding portion formed on the first pressing surface;
  a clutch disc being magnetically attractable and being moveable between the fixing base and the output disc along the first direction; the clutch disc having:
    a second surrounding teeth portion engaging with the first surrounding teeth portion, thereby the driving ring being capable of driving the clutch disc to rotate;
    multiple second toothed engaging portions formed on a surface of the clutch disc which faces towards the output disc, and the second toothed engaging portions selectively engaging with the first toothed engaging portions, and the second toothed engaging portions connected to each other; and
    a first abutting portion formed on another surface of the clutch disc which is away from the output disc;
  a pressing ring disposed between the first pressing surface and the clutch disc, and the pressing ring capable of moving along the first direction; the pressing ring detachably contacting the clutch disc and having:
    a second abutting portion formed on a surface of the pressing ring which faces towards the clutch disc, and the second abutting portion selectively abutting the first abutting portion, thereby the clutch disc being capable of driving the pressing ring to rotate; and
    a second sliding portion contacting the first sliding portion and capable of sliding with respect to the first sliding portion, thereby the pressing ring moving toward the output disc; and
  an elastic unit disposed between the fixing base and the surface of the pressing ring which faces towards the clutch disc, and the elastic unit abutting the fixing base and configured to push the pressing ring.

2. The transmission structure as claimed in claim 1, wherein each one of the first toothed engaging portions and each one of the second toothed engaging portions are ratchets, and a shape of the second toothed engaging portions corresponds to a shape of the first toothed engaging portions.

3. The transmission structure as claimed in claim 2, wherein each one of the first toothed engaging portions has:
  a first tooth surface and a second tooth surface connected to each other, and the first tooth surface and the second tooth surface extending toward the motor unit and inclined toward an opposite tangent direction of the first rotating direction.

4. The transmission structure as claimed in claim 3, wherein:
  the first sliding portion comprises an inclined surface facing towards the pressing ring and inclined with respect to the pressing ring; and
  the second sliding portion comprises a block contacting the inclined surface and capable of sliding with respect to the inclined surface.

5. The transmission structure as claimed in claim 4, wherein:
  the first abutting portion protrudes from the surface of the clutch disc which faces towards the pressing ring, and the second abutting portion protrudes from the surface of the pressing ring which faces towards the clutch disc, and thereby the first abutting portion is capable of pushing the second abutting portion along the first rotating direction.

6. The transmission structure as claimed in claim 5, wherein the fixing base comprises a first magnetic unit located between the clutch disc and the pressing ring.

7. The transmission structure as claimed in claim 6, wherein:
  the fixing base comprises a second pressing surface facing towards the first pressing surface; and
  the elastic unit is disposed between the second pressing surface and the pressing ring, and the elastic unit abuts the second pressing surface.

8. The transmission structure as claimed in claim 7, wherein:
  the first surrounding teeth portion is formed on an outer annular surface of the driving ring; and
  the second surrounding teeth portion is formed on an inner annular lateral surface of the clutch disc.

9. The transmission structure as claimed in claim 8, wherein the pressing ring is magnetically attractable, and a second magnetic unit configured to attract the pressing ring is mounted on the fixing base.

10. The transmission structure as claimed in claim 7, wherein:
  the first surrounding teeth portion is formed on an inner annular surface of the driving ring; and
  the second surrounding teeth portion is formed on an outer annular lateral surface of the clutch disc.

11. The transmission structure as claimed in claim 10, wherein the pressing ring is magnetically attractable, and a second magnetic unit configured to attract the pressing ring is mounted on the fixing base.

12. The transmission structure as claimed in claim 1, wherein:
  the first sliding portion comprises an inclined surface facing towards the pressing ring and inclined with respect to the pressing ring; and
  the second sliding portion comprises a block contacting the inclined surface and capable of sliding with respect to the inclined surface.

13. The transmission structure as claimed in claim 1, wherein:
the first abutting portion protrudes from the surface of the clutch disc which faces towards the pressing ring, and the second abutting portion protrudes from the surface of the pressing ring which faces towards the clutch disc, and thereby the first abutting portion is capable of pushing the second abutting portion along the first rotating direction.

14. The transmission structure as claimed in claim 1, wherein the fixing base comprises a first magnetic unit located between the clutch disc and the pressing ring.

15. The transmission structure as claimed in claim 1, wherein:
the fixing base comprises a second pressing surface facing towards the first pressing surface; and
the elastic unit is disposed between the second pressing surface and the pressing ring, and the elastic unit abuts the second pressing surface.

16. The transmission structure as claimed in claim 1, wherein:
the first surrounding teeth portion is formed on an outer annular surface of the driving ring; and
the second surrounding teeth portion is formed on an inner annular lateral surface of the clutch disc.

17. The transmission structure as claimed in claim 1, wherein:
the first surrounding teeth portion is formed on an inner annular surface of the driving ring; and
the second surrounding teeth portion is formed on an outer annular lateral surface of the clutch disc.

18. The transmission structure as claimed in claim 1, wherein the pressing ring is magnetically attractable, and a second magnetic unit configured to attract the pressing ring is mounted on the fixing base.

\* \* \* \* \*